Figure 1:
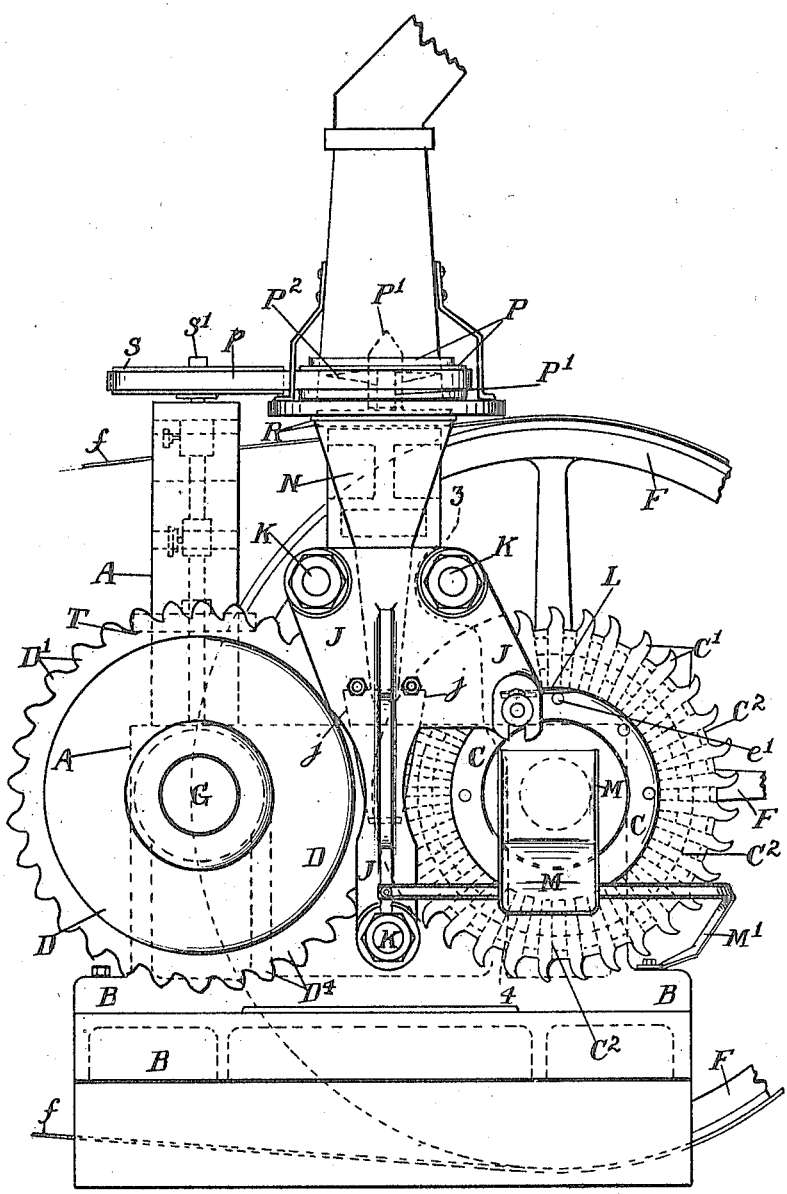

G. R. SCHUELER.
MACHINE FOR COMPRESSING OR MOLDING PLASTIC SUBSTANCES.
APPLICATION FILED MAY 22, 1914.

1,127,925.

Patented Feb. 9, 1915.

G. R. SCHUELER.
MACHINE FOR COMPRESSING OR MOLDING PLASTIC SUBSTANCES.
APPLICATION FILED MAY 22, 1914.

1,127,925.

Patented Feb. 9, 1915.

G. R. SCHUELER.
MACHINE FOR COMPRESSING OR MOLDING PLASTIC SUBSTANCES.
APPLICATION FILED MAY 22, 1914.
1,127,925.
Patented Feb. 9, 1915.
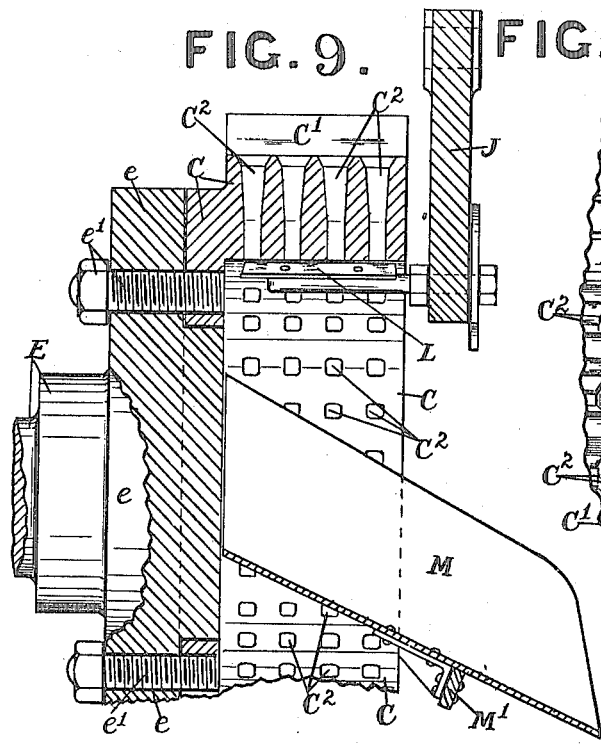
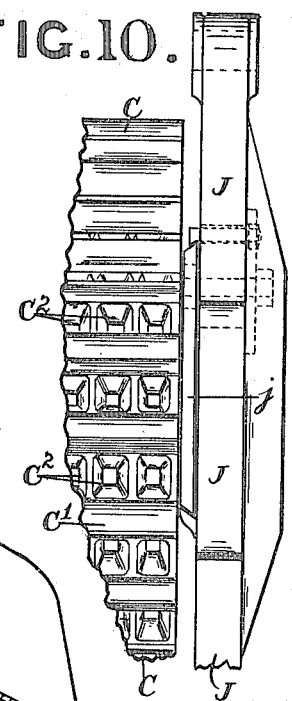
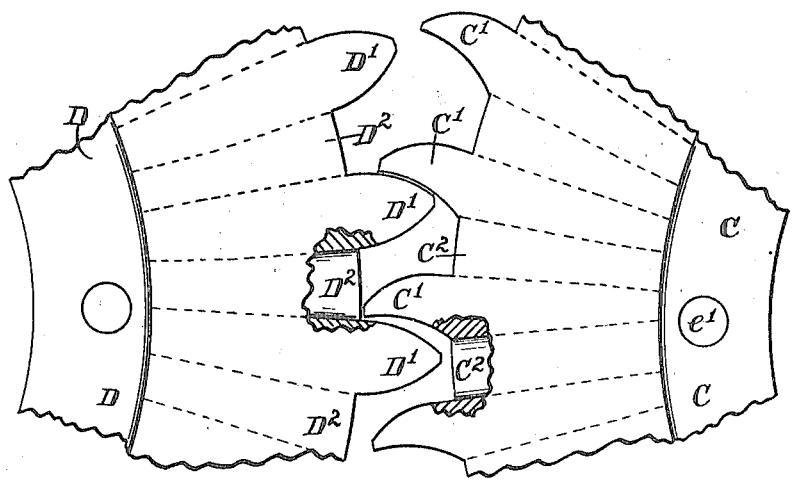

UNITED STATES PATENT OFFICE.

GEORGE RICHARD SCHUELER, OF KINGSTON-UPON-HULL, ENGLAND.

MACHINE FOR COMPRESSING OR MOLDING PLASTIC SUBSTANCES.

1,127,925. Specification of Letters Patent. Patented Feb. 9, 1915.

Application filed May 22, 1914. Serial No. 840,295.

*To all whom it may concern:*

Be it known that I, GEORGE RICHARD SCHUELER, a citizen of the United States, but at present residing in the city and county of Kingston-upon-Hull, England, have invented certain new and useful Improvements in Machines for Compressing or Molding Plastic Substances; and I do hereby declare the following to be a full, clear, and exact description of the invention, such as will enable others skilled in the art to which it appertains to make and use the same.

This invention has reference to compressing or molding machinery or apparatus of that kind which comprises toothed wheels or drums which rotate in contact and in opposite directions, the spaces between the teeth of one wheel or drum forming pockets in which the material fed between the two wheels or drums is compressed by the teeth of the other wheel or drum during the period of meshing of the teeth of the said two wheels or drums, the compressed material, which is formed into blocks of the same shape as the spaces in which they are compressed, falling out between the two wheels or drums after the meshing of the teeth ceases either as a result of their own weight and the rotation of the drums, or as a result of being forced out by mechanical means.

The present invention has for its object, an improved machine of the kind referred to, designed more particularly for compressing or molding seed, meal or the like into solid form for use as food for cattle or other animals, but which is also adapted to press soft or plastic materials generally into solid form for other purposes, and whereby considerably increased compression of the material is obtained, the material being compressed in molds which extend through a ring or drum, or through rings or drums, the resultant compressed material being forced through the drum or drums to the interior thereof and being cut into pieces of the desired length as it exudes through the holes or molds to the inside of the drum or drums.

In constructing a pressing or molding machine in accordance with my invention, and according to one mode, I employ a ring or drum which I will call the "mold-drum," which is provided around its periphery with teeth between the bases of each two of which is a tapered or other suitable hole, or a plurality of holes which run through the drum to the interior thereof, and in which holes, which constitute molds, compression of the meal or the like material actually takes place, said mold-drum being keyed or otherwise fixedly mounted on a shaft or secured to a shaft driven by any suitable means, said shaft being rotatable in suitable bearings on the machine frame. Keyed or otherwise fixedly mounted on a second shaft rotatable in bearings also carried by the machine frame is what I will call a "toothed compressing drum," the teeth of which are of such a configuration that as the said drum and the mold-drum rotate, such teeth when they commence to mesh with the teeth on the mold-drum, close up the spaces between the teeth on the mold-drum and work in such spaces in such a way as to compress the meal or other material fed between the peripheries of the said mold-drum and of the said compressing drum and force such meal or the like into the tapered holes in the mold-drum in which it becomes compressed and passes out of such holes to the inside of the mold-drum. Mounted inside the mold-drum is a knife, or more than one, so set that its edge, or the edge of each is in contact, or practically in contact with the inner face of the said mold-drum, whereby, as the drum rotates and the compressed meal or the like exudes through the holes or molds to the interior of the drum, it is cut off by the knife or knives as each protruding portion comes in contact with the edge of the knife, or of each knife, as the case may be, consequent on the rotation of the said drum. A hopper, chute or the like is suitably supported in the mold-drum to receive the pieces of compressed material when they fall after being cut. The mold-drum and the compressing drum are driven by any suitable means whereby they will have rotation in opposite directions imparted to them. The meal or the like to be compressed, is fed between the peripheries of the mold-drum and the compressing drum respectively, as before mentioned, and to prevent such meal or the like during the period of its compression between the teeth of the mold-drum from exuding at the sides of such teeth, plates, which I will call "cheek-plates," are secured at each side of the mold-drum and the compressing drum to cover the meshing point of the teeth of the said two drums and to project to a suitable height above the point where the teeth of the two first engage, an additional plate for taking the wear being fitted to the inside of each cheek-plate, said cheek-plates in addition to preventing the exudation at the sides of the teeth of the meal or the like being compressed, also constitute a kind of hopper into which the meal or the like is fed to insure its entering the spaces between the teeth of the mold-drum. The meal or the like to be compressed is preferably fed to the spaces between the teeth of the mold-drum in pre-determined quantities, one and a convenient means for so feeding it consisting in delivering it into a feed spout or the like in which is a controlling device consisting of a rotatable worm-like device on to which the meal or the like falls and which cuts into the meal or the like and carries down a suitable portion of the same at each rotation and delivers it between the peripheries of the mold-drum and the compressing drum to undergo the process of pressing, as before described.

In place of employing one drum only as a mold-drum and employing the other solely as a compressing drum, I may provide both drums with molds and make them both effect the double purpose of mold-drums and compressing drums, in which case the teeth of that drum which has been described as the compressing drum would be altered in shape to allow of molds being provided between them and carried through to the interior of the said drum.

Having thus stated broadly the objects and nature of my said invention, I will now proceed to more fully describe the same with reference to the accompanying five sheets of drawings, on which—

Figure 2:
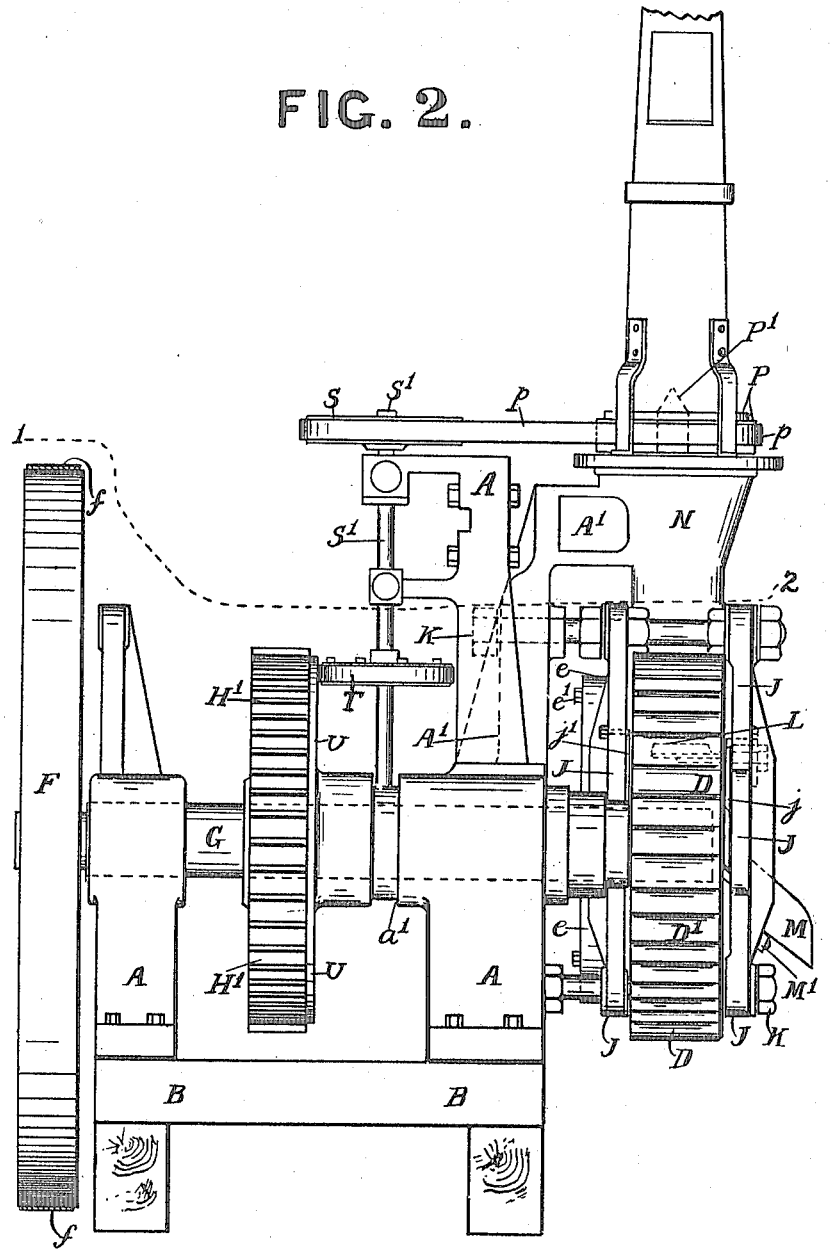
Figure 3:
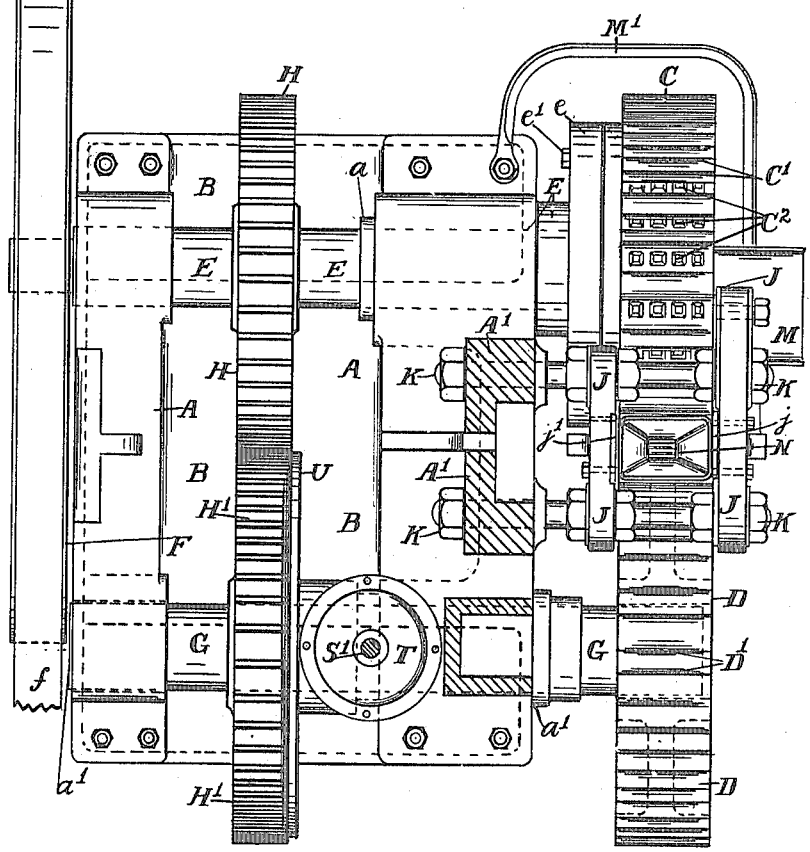
Figure 4:
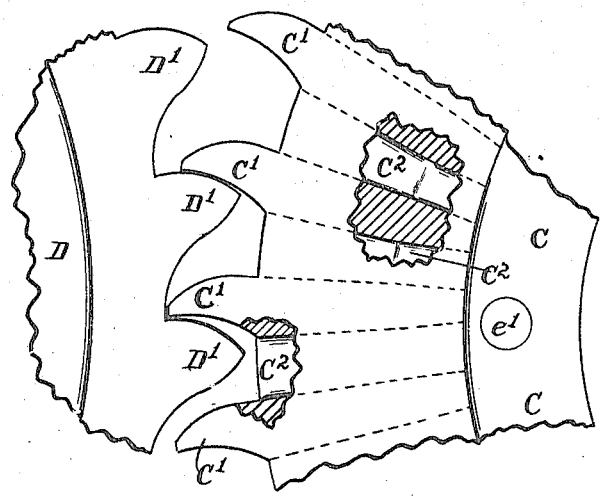
Figure 5:
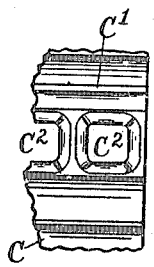
Figure 6:
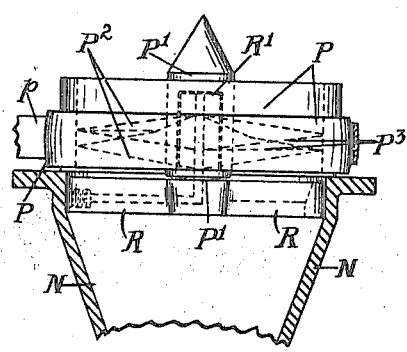
Figure 7:
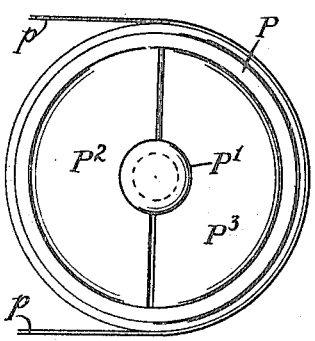
Figure 8:
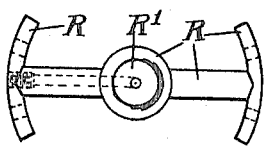

Figure 1 is a side view of a compressing or molding machine having a mold wheel or drum, and a wheel or drum solely for compressing purposes, in accordance with my invention; Fig. 2 is a front view and Fig. 3 a plan view of same; Fig. 4 is a side view of a portion of the mold-drum and of the compressing drum; Fig. 5 is a face view of a portion of the mold-drum; Fig. 6 is a section of a portion of the feed hopper and shows the feed controller mounted on the top thereof; Fig. 7 is a plan view of the feed controller; Fig. 8 is a plan view of the bridge piece in which the feed controller is mounted; Fig. 9 is a section of part of the mold-drum and its shaft and shows the knife for cutting the compressed material into pieces as it exudes through the molds, and the chute for receiving the cut pieces; Fig. 10 represents a front view of a portion of the mold-drum and shows the cheek-plate at one side thereof and the renewal plate at the inside of such cheek-plate, and Fig. 11 is a side view of a modification showing a portion of each of the two drums both provided with molds and both with teeth to compress, whereby compression of the material takes place in both drums in place of in one drum only.

Like parts are marked with the same reference characters when they appear in more than one figure.

Referring first to Figs. 1 to 10 inclusive of the drawings which illustrate one form of my improved machine, A indicates the machine frame and B the base of the same, C the hollow mold-drum and D the compressing wheel or drum. The mold-drum C is provided with curved teeth $C^1$ and with molds $C^2$, the molds being in the form of holes situated between the teeth of the drum and run from the bases of the teeth to the interior of the drum, one or more of such molds being provided between each two teeth depending upon the width of the drum, four molds between each two teeth being shown in the accompanying drawings, see Figs. 3 and 9. The molds by preference taper from the outside for a suitable distance into the drum and then continue in the form of a hole of a uniform size to the interior of the drum, as shown at Figs. 4 and 5, the final compression of the material taking place in the latter mentioned portion where it is given the required cross-sectional shape. The compressing wheel or drum D, also, has curved teeth $D^1$ on its periphery, said teeth being of practically the same depth as the teeth on the mold-drum, one face of such teeth having the same or practically the same curve as that face of the teeth of the mold-drum in contact with which they work whereby the teeth of such compressing wheel or drum work on the entire face of the teeth of the mold-drum, as will be seen on referring to Fig. 4 of the drawings. E is the mold-drum shaft provided according to one mode at the end adjacent to the mold-drum, with a heavy flange $e$ to which the mold-drum is secured by bolts $e^1$ or other means suitable for the purpose, said shaft being rotatable in bearings $a$, $a$ on the machine frame A. Said shaft has also keyed or otherwise fixedly mounted on its opposite end, a suitable driving wheel or pulley F, a pulley being shown in the drawings, said pulley being driven from any suitable source of drive by means of a belt or the like $f$, and G is the shaft on which the compressing wheel or drum D is mounted, said shaft being rotatable in other bearings $a^1$, $a^1$ on the machine frame A. For driving the compressing wheel or drum D, a spur or like wheel H is keyed or otherwise fixedly mounted on the mold-drum shaft E and a similar wheel $H^1$ on the compressing wheel shaft G, both wheels being of the same diameter and having teeth of the same pitch, which two wheels by meshing cause the rotation of the compressing wheel or drum shaft and consequently of the compressing wheel or drum itself, and by their fine adjustment cause the teeth of the compressing wheel or drum to enter the spaces between the teeth on the mold-drum and to work on the adjoining faces of the mold-drum teeth with the most perfect exactness and without there being any liability of the peripheries of the teeth of the respective drums hitting or coming in contact. J, J are two cheek-plates fitted the one at one side and the other at the opposite side of the mold-drum and the compressing wheel or drum at the point where the two drums are in engagement, to inclose such point and to prevent exudation at the sides of the teeth of the mold-drum, of the material being compressed, said plates also forming a kind of hopper which insures the material to be compressed being fed directly between the mold-drum and the compressing wheel or drum, and $j$, $j^1$ are plates fitted to the inside of the cheek-plates to take the wear caused by the rotation of the mold-drum and the compressing wheel or drum. The cheek-plates J, J are secured by bolts K or other suitable means to a vertical portion or upright $A^1$ on the machine frame. L, (Figs. 1 and 9) is a knife secured to the inside face of the outer cheek-plate J, said knife being so set as to be in contact, or almost in contact with the inside face of the mold-drum whereby as such drum rotates, the compressed material protruding through the molds into the interior of the said drum, is cut off by the said knife, and M is a chute for receiving the cut pieces of compressed material as they fall and for delivering them outside the mold-drum, said chute being supported by any suitable means, one and a convenient means consisting of a frame $M^1$ mounted outside the mold-drum, to which frame the said chute is bolted or otherwise suitably secured. N is a hopper into which the material to be compressed is first fed, and down which it passes to the space between the mold-drum and the compressing wheel or drum, said hopper being preferably provided with a feed controller in the form of a ring or wheel-like casing P having a central boss or spindle $P^1$ between which and the inside face of the casing P are any suitable number of blades so formed as to constitute to all intents and purposes a short section of a worm, the accompanying drawings showing the casing as being provided with two blades $P^2$, and $P^3$. A bridge piece R is fitted in the top of the hopper N and is, according to one mode, provided with a vertical spindle $R^1$ which passes up into the spindle $P^1$ of the casing P which spindle $P^1$ is hollowed to receive it, the said spindle $P^1$ with its casing P being adapted to rotate freely on the spindle $R^1$. If desired, the arrangement may be reversed and the spindle of the bridge be hollow to receive the spindle $P^1$ of the casing P, the spindle $P^1$ being adapted to rotate freely in the hollow spindle $R^1$.

The device may be driven by any suitable means, one and a convenient arrangement consisting in driving it by means of a belt or the like $p$ from a pulley S on the top of a spindle $S^1$ driven by means of a wheel T which runs in frictional contact with a friction disk U on the shaft G, or on the side of the spur wheel $H^1$ on such shaft G. The speed at which the controller is driven may be varied by altering the position of the friction wheel T on its spindle to cause it to bear at the desired point on the friction disk U. The material to be fed to the mold-drum falls on to the top of the blades of the feed controller, which blades as they rotate cut through the said material, the cut material falling down into the hopper N and thence between the mold-drum and the compressing wheel or drum and is compressed in the molds in the mold-drum as before described.

In the modification illustrated at Fig. 11 of the drawings, both the drum C and the drum D are provided with molds, $C^2$ indicating the molds in the drum C and $D^2$ those in the drum D. The teeth $D^1$ on the drum D are in this case of a slightly different shape from the shape shown in Figs. 1 and 4, where such drum is illustrated as a compressing drum only, said teeth in the present instance having both sides alike, or practically alike, thereby to allow of mold-spaces being formed between them. By providing both the said drums C and D with molds compressing of material takes place in both drums simultaneously thereby doubling the output of the machine. The drum D is in this case provided with a knife or knives and with a chute or the like (not shown) as in the case of the drum C.

I claim:—

1. In a press, the combination, of two revoluble mold drums provided with intercurrent teeth for compressing the material, one of said drums having a central delivery chamber and radially arranged molds formed between the base portions of its teeth and extending between its periphery and the said chamber.

2. In a press, the combination, of two revoluble mold drums provided with intercurrent teeth for compressing the material, one of the said drums having a central delivery chamber and radially arranged molds extending between its periphery and the said chamber, and a stationary knife blade arranged in the said chamber at the outlet ends of the molds and operating to sever the compressed material which is protruded from them.

3. In a press, the combination, of two revoluble mold drums provided with intercurrent teeth for compressing the material, one of the said drums having a central delivery chamber and radially arranged molds formed between the base portions of its teeth and extending between its periphery and the said chamber, and a stationary discharge chute projecting within the delivery chamber and discharging the compressed material to one side of the machine.

4. In a press, the combination, of two revoluble mold drums provided with intercurrent teeth for compressing the material, each of the said drums having a central delivery chamber and radially arranged molds extending between its periphery and its delivery chamber.

In testimony whereof I affix my signature, in presence of two witnesses.

GEORGE RICHARD SCHUELER.

Witnesses:
 LOUIS EDGAR KIPPAX,
 FRED. HAROLD RHODES.